(12) United States Patent
Chungbin

(10) Patent No.: US 10,286,998 B2
(45) Date of Patent: May 14, 2019

(54) MECHANICAL FASTENING SYSTEM AND ASSOCIATED STRUCTURAL ASSEMBLY AND METHOD

(71) Applicant: The Boeing Company, Chicago, IL (US)

(72) Inventor: Jerry D. Chungbin, Kenmore, WA (US)

(73) Assignee: The Boeing Company, Chicago, IL (US)

( * ) Notice: Subject to any disclaimer, the term of this patent is extended or adjusted under 35 U.S.C. 154(b) by 570 days.

(21) Appl. No.: 15/147,002

(22) Filed: May 5, 2016

(65) Prior Publication Data
US 2017/0320560 A1 Nov. 9, 2017

(51) Int. Cl.
| | | |
|---|---|---|
| *B64C 3/18* | (2006.01) | |
| *F16B 5/06* | (2006.01) | |
| *E04B 1/18* | (2006.01) | |
| *E04B 1/19* | (2006.01) | |

(Continued)

(52) U.S. Cl.
CPC .............. *B64C 3/187* (2013.01); *B64F 5/10* (2017.01); *B64F 5/40* (2017.01); *E04B 1/185* (2013.01);
(Continued)

(58) Field of Classification Search
CPC ... B64C 3/18; B64C 3/187; B64F 5/10; B64F 5/40; F16B 5/06; F16B 5/0607; F16B 5/0621; F16B 5/0635; F16B 5/02; F16B 2200/403; F16B 2200/406; F16B 2200/50; F16B 2200/509; F16B 2/065; Y10T 403/7047; Y10T 403/7051;
(Continued)

(56) References Cited

U.S. PATENT DOCUMENTS 1,687,777 A * 10/1928 McMurtrie et al. .. B23B 31/101
 24/525
3,827,661 A 8/1974 Ryan et al.
(Continued)

FOREIGN PATENT DOCUMENTS

| DE | 7811183 | 7/1978 |
|---|---|---|
| WO | WO2008012569 | 1/2008 |

OTHER PUBLICATIONS

European Patent Office, Extended European Search Report, EP 17 16 7311 (dated Oct. 4, 2017).

*Primary Examiner* — Jonathan P Masinick
(74) *Attorney, Agent, or Firm* — Walters & Wasylyna LLC

(57) ABSTRACT

A structural assembly including a first structural member defining a first partial bore and including a first protrusion extending from a periphery of the first partial bore on a first side and a second protrusion extending from the periphery of the first partial bore on a second side, a second structural member defining a second partial bore and including a first protrusion extending from a periphery of the second partial bore on a first side and a second protrusion extending from the periphery of the second partial bore on a second side, wherein the second partial bore is aligned with the first partial bore to define a through-bore, a first engagement member engaged with the first protrusions and a second engagement member engaged with the second protrusions, wherein the first and second structural members are clamped between the first and second engagement members.

20 Claims, 10 Drawing Sheets

(51) Int. Cl.
  *F16B 5/02*   (2006.01)
  *B64F 5/10*   (2017.01)
  *B64F 5/40*   (2017.01)

(52) U.S. Cl.
  CPC .............. *E04B 1/1903* (2013.01); *F16B 5/02* (2013.01); *F16B 5/0607* (2013.01)

(58) Field of Classification Search
  CPC ......... Y10T 403/7052; Y10T 403/7056; F16D 1/08; F16D 1/0829; F16D 1/0841; F16D 1/0864
  See application file for complete search history.

(56) References Cited

U.S. PATENT DOCUMENTS

| | | | |
|---|---|---|---|
| 4,356,616 A | | 11/1982 | Scott |
| 4,600,334 A | * | 7/1986 | Soussloff ................ F16D 1/094 242/573 |
| 5,067,847 A | * | 11/1991 | Muellenberg ........... F16D 1/094 403/342 |
| 5,474,403 A | * | 12/1995 | Hetrich ................... F16D 1/094 403/369 |
| 6,386,481 B1 | | 5/2002 | Kallinen |
| 8,596,600 B2 | * | 12/2013 | Spencer ................ A47B 97/001 248/447.1 |
| 9,618,051 B2 | * | 4/2017 | Heston ................... F16D 1/094 |
| 2005/0220534 A1 | * | 10/2005 | Ober ....................... B65H 75/08 403/370 |
| 2005/0236524 A1 | | 10/2005 | Sarh |
| 2008/0144986 A1 | * | 6/2008 | Wajda ................... F16C 35/073 384/538 |

* cited by examiner

MECHANICAL FASTENING SYSTEM AND ASSOCIATED STRUCTURAL ASSEMBLY AND METHOD

FIELD

This application relates to the joining of structural members and, more particularly, to a mechanical fastening system for joining one structural member to one or more other structural members.

BACKGROUND

The wing of an aircraft is typically constructed from ribs, spars and skin panels (e.g., an upper skin panel and a lower skin panel). Specifically, the ribs are spaced apart from each other along the length of the wing. The forward ends of the ribs are connected to the forward spar, while the aft ends of the ribs are connected to the aft spar. The upper skin panel is connected to the upper portion of each rib, while the lower skin panel is connected to the lower portion of each rib.

Thus, the ribs, the spars and the skin panels define an enclosed wing box that, for certain aircraft, may be used as a tank for fuel storage purposes. Once the wing box is enclosed, any work that must be performed in the wing requires personnel to enter a confined space. Therefore, various safety precautions must be taken, which increases the overall cost of aircraft manufacture.

To avoid the confined space issue, split wing designs were developed. As one example, a two-piece rib was used, wherein the upper skin panel was connected to an upper rib portion and the lower skin panel was connected to a lower rib portion. Therefore, the wing box may be opened to facilitate work or inspection, and then closed by joining the upper rib portion with the lower rib portion. However, the process of aligning and joining the upper and lower rib portions is time consuming and the fasteners used add significant weight to the aircraft.

Accordingly, those skilled in the art continue with research and development efforts directed to the joining of structural members.

SUMMARY

A structural assembly is disclosed. In one example, the disclosed structural assembly may include a first structural member including a first side and a second side opposite the first side, and defining a first partial bore extending from the first side to the second side, the first structural member further including a first protrusion protruding proximate a periphery of the first partial bore on the first side of the first structural member and a second protrusion protruding proximate the periphery of the first partial bore on the second side of the first structural member, a second structural member including a first side and a second side opposite the first side, and defining a second partial bore extending from the first side to the second side, the second structural member further including a first protrusion protruding proximate a periphery of the second partial bore on the first side of the second structural member and a second protrusion protruding proximate the periphery of the second partial bore on the second side of the second structural member, wherein the second partial bore is aligned with the first partial bore along a bore axis to define a through-bore, a first engagement member engaged with both the first protrusion of the first structural member and the first protrusion of the second structural member and a second engagement member engaged with both the second protrusion of the first structural member and the second protrusion of the second structural member, wherein the first structural member and the second structural member are clamped between the first engagement member and the second engagement member.

Also disclosed is a method for joining a first structural member to a second structural member, each of the first structural member and the second structural member including a first side, a second side opposite the first side, a partial bore extending from the first side to the second side, a first protrusion protruding proximate a periphery of the partial bore on the first side, and a second protrusion protruding proximate the periphery of the partial bore on the second side. In one example, the disclosed method may include the steps of (1) aligning the partial bore of the first structural member with the partial bore of the second structural member along a bore axis to define a through-bore; (2) positioning a first engagement member into engagement with both the first protrusion of the first structural member and the first protrusion of the second structural member; (3) positioning a second engagement member into engagement with both the second protrusion of the first structural member and the second protrusion of the second structural member; and (4) applying a clamping force to the first engagement member and the second engagement member to clamp the first structural member and the second structural member between the first engagement member and the second engagement member.

Other embodiments of the disclosed mechanical fastening system and associated structural assembly and method will become apparent from the following detailed description, the accompanying drawings and the appended claims.

DETAILED DESCRIPTION

Figure 1:
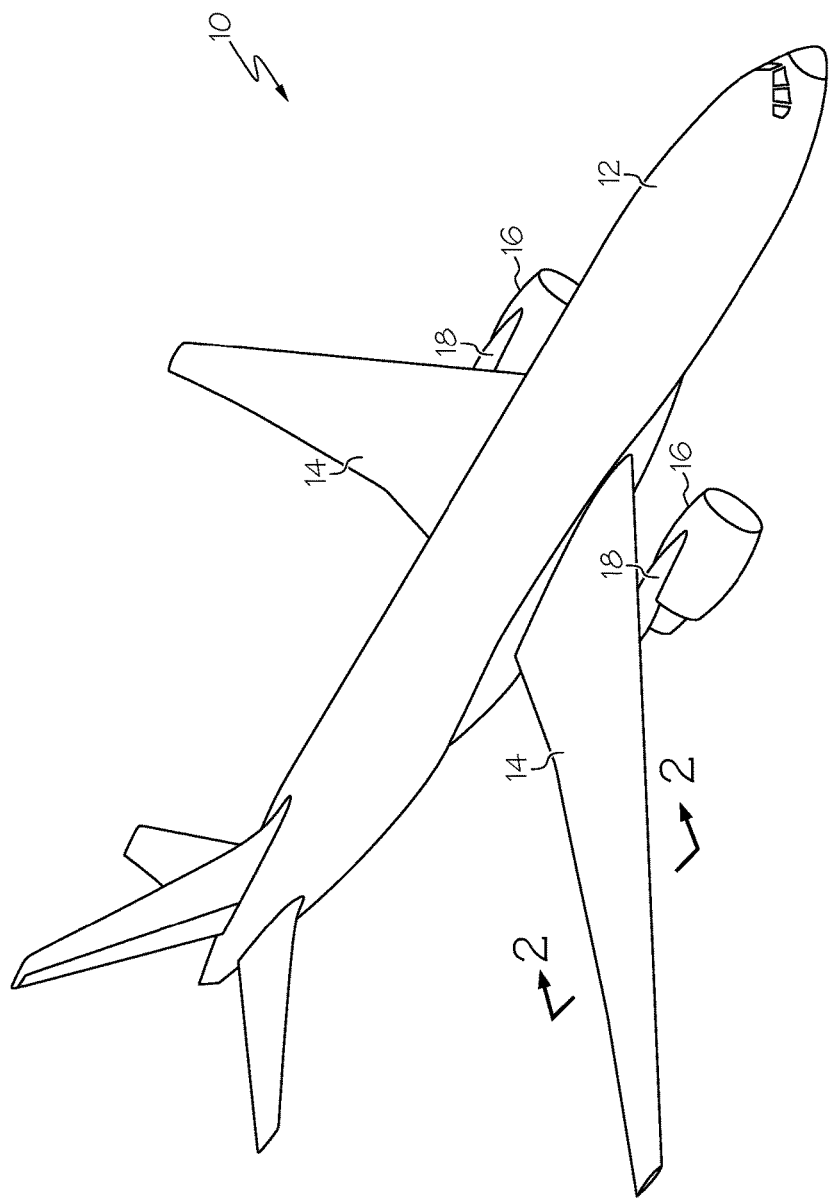
FIG. 1 is a schematic perspective view of an example aircraft incorporating the disclosed mechanical fastening system.

The disclosed mechanical fastening system 100 (FIGS. 3A and 3B) may be incorporated into an aircraft, such as a fixed-wing aircraft 10, as shown in FIG. 1, or a rotary-wing aircraft. Various aircraft, including commercial aircraft, personal aircraft and military aircraft, may benefit from the disclosed mechanical fastening system 100 without departing from the scope of the present disclosure. Various non-aircraft applications, including non-aerospace applications, for the disclosed mechanical fastening system 100 are also contemplated.

Referring to FIG. 1, an aircraft 10 may include a fuselage 12, one or more wings 14 (two wings 14 are shown in FIG. 1) and one or more engines 16 (two engines 16 are shown in FIG. 1). Each wing 14 of the aircraft 10 may be fixedly connected to, and may outwardly extend from, the fuselage 12. Each engine 16 may be connected to (e.g., suspended below) an associated wing 14 by way of a pylon 18.

Figure 2:
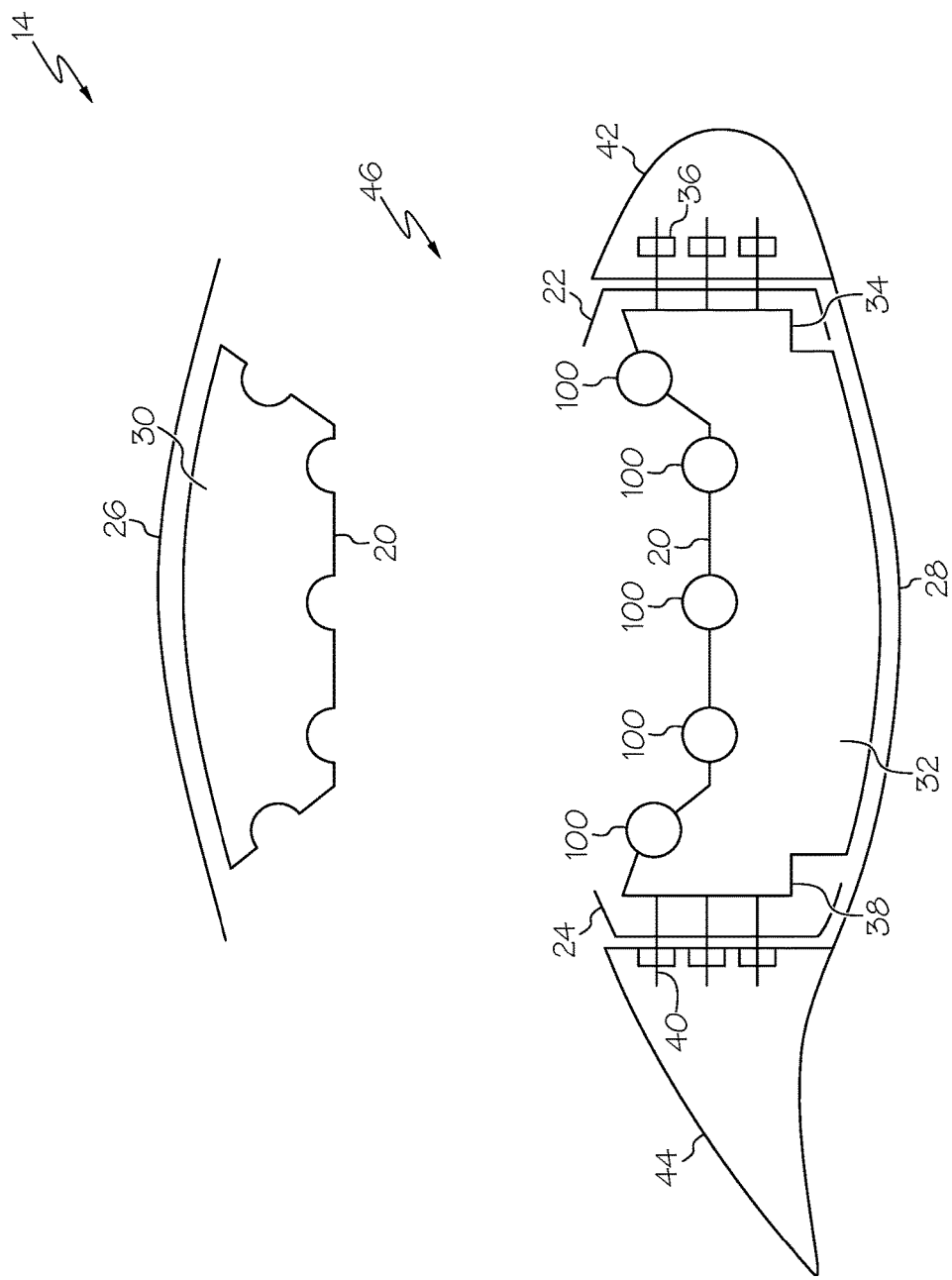
FIG. 2 is a side cross-sectional view, partially exploded, of a portion of a wing of the aircraft of FIG. 1.

Referring to FIG. 2, each wing 14 of the aircraft 10 may include ribs 20 (only one rib 20 is shown in FIG. 2), a forward spar 22, an aft spar 24, a first (e.g., upper) skin portion 26 and a second (e.g., lower) skin portion 28. The rib 20 may include a first (e.g., upper) rib portion 30 and a second (e.g., lower) rib portion 32. The first skin portion 26 may be connected to the first rib portion 30 and the second skin portion 28 may be connected to the second rib portion 32. The first rib portion 30 may be connected to the second rib portion 32 using the disclosed mechanical fastening system 100, thereby forming the assembled rib 20.

The forward end 34 of the rib 20 may be connected to the forward spar 22, such as with mechanical fasteners 36, and the aft end 38 of the rib 20 may be connected to the aft spar 24, such as with mechanical fasteners 40. Additionally, a forward control surface 42 (e.g., a slat) may be connected to the forward spar 22 and an aft control surface 44 (e.g., an aileron) may be connection to the aft spar 24. Therefore, the wing 14 may include a wing box 46 defined by the ribs 20, the forward and aft control surfaces 42, 44 and the first and second skin portions 26, 28.

As shown in FIG. 2, the wing 14 may be opened by separating from the wing box 46 the first rib portion 30 and associated first skin portion 26. Such separation may be achieved by disconnecting the first rib portion 30 from the second rib portion 32 by way of the disclosed mechanical fastening system 100. Then, once any work and/or inspection within the wing 14 has been completed, the wing 14 may be closed by joining the first rib portion 30 (and associated first skin portion 26) with the second rib portion 32 by way of the disclosed mechanical fastening system 100.

Figure 3A:
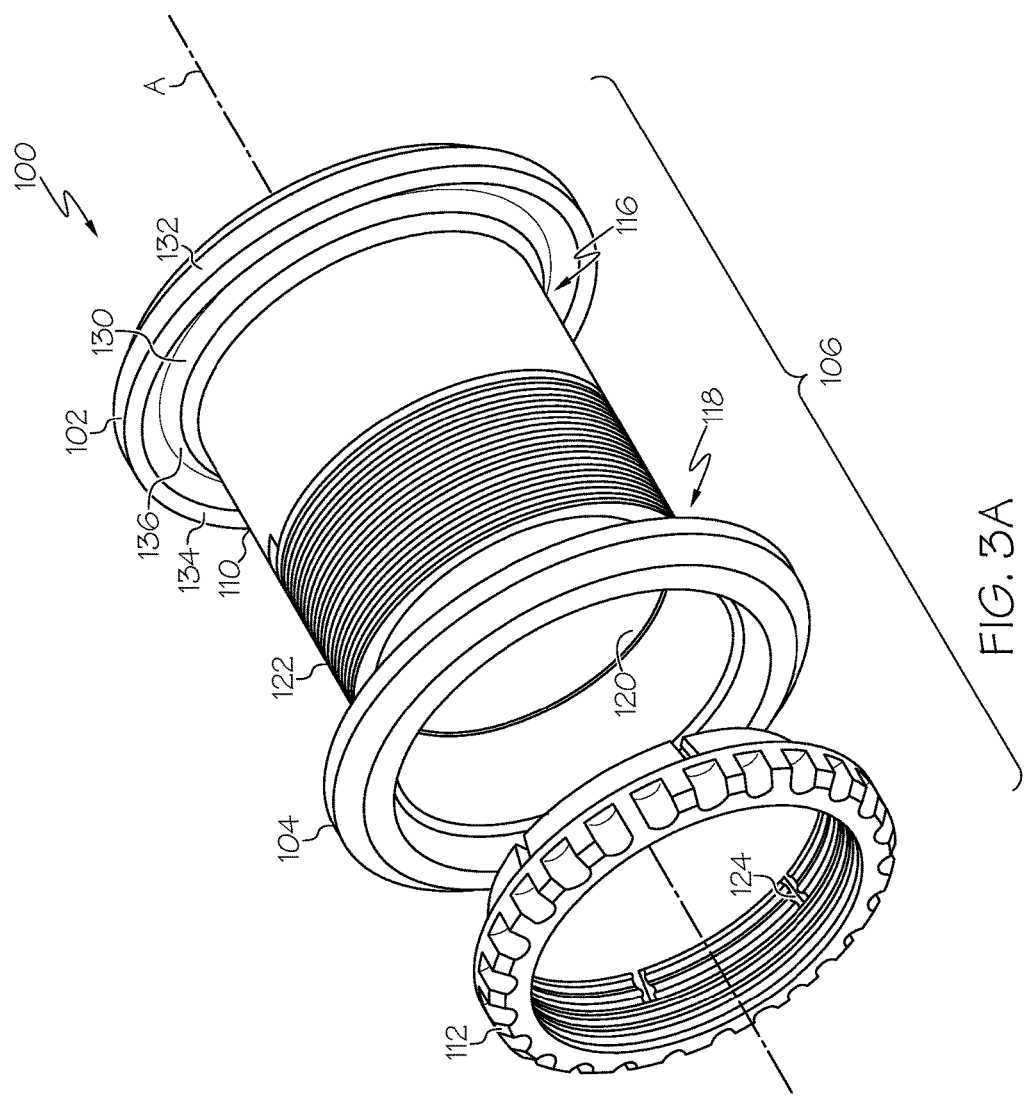
FIGS. 3A and 3B are exploded perspective views of one embodiment of the disclosed mechanical fastening system.
Figure 3B:
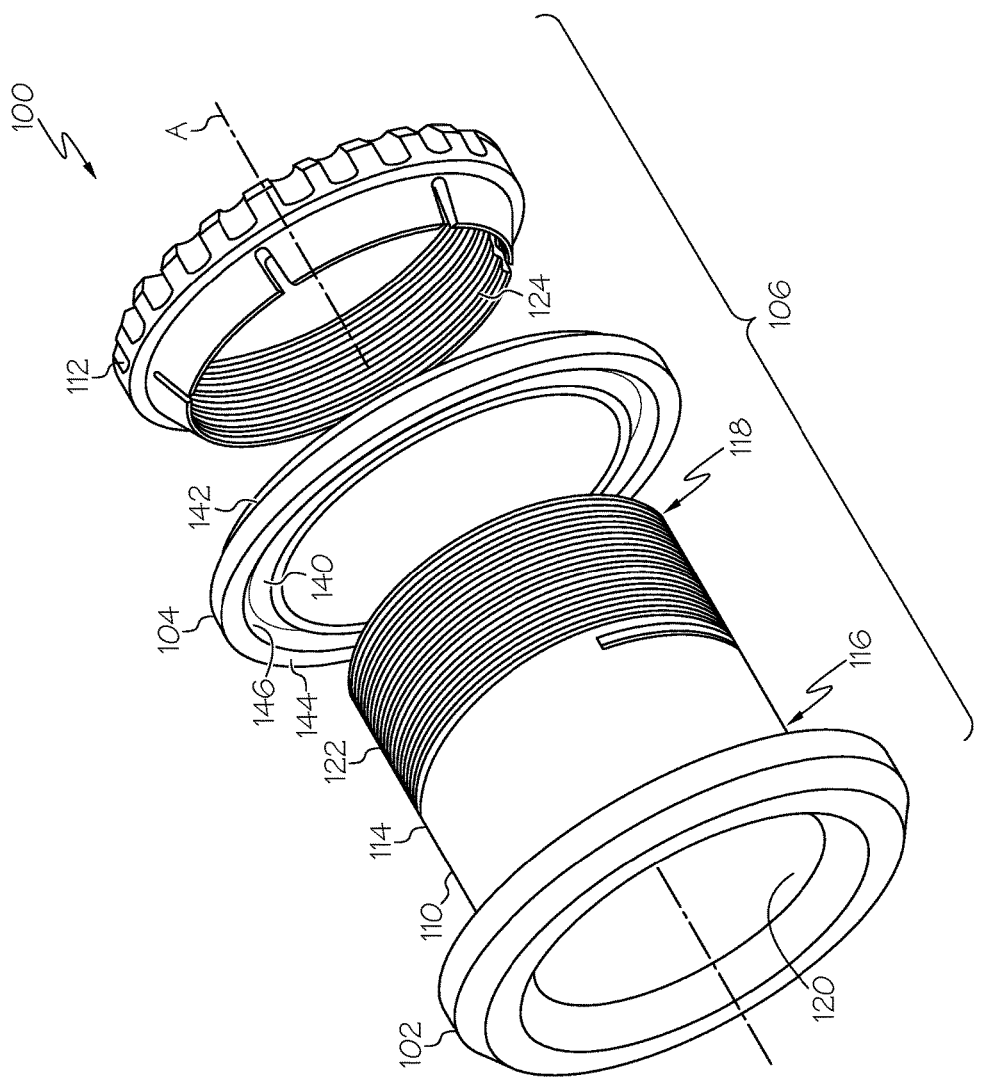

Referring to FIGS. 3A and 3B, one embodiment of the disclosed mechanical fastening system, generally designated 100, may include a first engagement member 102, a second engagement member 104 and a clamping assembly 106. The first engagement member 102 may be aligned with the second engagement member 104 along a longitudinal axis A. The clamping assembly 106 may be engaged with both the first engagement member 102 and the second engagement member 104 to urge the first engagement member 102 axially toward (along longitudinal axis A) the second engagement member 104, thereby facilitating clamping of structural members therebetween, as is described in greater detail herein.

In the embodiment of FIGS. 3A and 3B, the clamping assembly 106 may include a bolt member 110 and a nut member 112. The bolt member 110 may engage the first engagement member 102. The nut member 112 may engage the second engagement member 104, and may be in threaded engagement with the bolt member 110. Therefore, the first engagement member 102 may be axially urged toward the second engagement member 104 by threading the nut member 112 onto the bolt member 110.

Specifically, the bolt member 110 of the clamping assembly 106 may include a shaft 114 that is elongated along the longitudinal axis A, and includes a first end portion 116 and a second end portion 118 longitudinally opposed from the first end portion 116. The shaft 114 of the bolt member 110 may optionally define a bolt member through-bore 120 extending from the first end portion 116 to the second end portion 118. While optional, using a bolt member 110 having a bolt member through-bore 120 may reduce the overall weight of the mechanical fastening system 100 and may provide a route (the bolt member through-bore 120) for running wires, hoses, tubes and the like.

The first engagement member 102 of the disclosed mechanical fastening system 100 may be fixedly connected to the first end portion 116 of the shaft 114 of the bolt member 110 of the clamping assembly 106. For example, as shown in FIGS. 3A and 3B, the first engagement member 102 may be integral with the first end portion 116 of the shaft 114 of the bolt member 110 (e.g., the bolt member 110 and the first engagement member 102 may be formed as a single monolithic body). When the bolt member 110 has a bolt member through-bore 120, the first engagement member 102 may be generally ring-shaped so as not to obstruct the bolt member through-bore 120.

Threads 122 may extend along the shaft 114 of the bolt member 110 from the second end portion 118 of the shaft 114 toward the first end portion 116. The nut member 112 may be provided with corresponding threads 124, and may be threaded onto the shaft 114 of the bolt member 110. Therefore, when the second engagement member 104 of the disclosed mechanical fastening system 100 is coaxially received over the shaft 114 of the bolt member 110 (like a washer), the process of threading the nut member 112 onto the bolt member 110 may bring the nut member 112 into abutting engagement with the second engagement member 104, thereby urging the second engagement member 104 along the shaft 114 toward the first engagement member 102.

While the clamping assembly 106 is shown and described employing a threaded engagement, it is contemplated that clamping assemblies may be used that employ various techniques other than threading (e.g., ratcheting) to effect approximation of the first engagement member 102 with the second engagement member 104. The use of non-thread-based clamping assemblies will not result in a departure from the scope of the present disclosure.

As shown in FIG. 3A, the first engagement member 102 of the disclosed mechanical fastening system 100 may define a recess 130 that axially protrudes into the first engagement member 102 and opens toward the second engagement member 104. In one particular construction, the first engagement member 102 may include a ring-shaped body 132 having an annular surface 134, and the recess 130 may be a groove 136 circumferentially extending along the annular surface 134. While the groove 136 is shown in FIG. 3A as being continuous, it is also contemplated that the groove 136 may be discontinuous (e.g., comprised of two or more spaced groove segments).

While the engagement members 102, 104 are shown in the drawings as having a ring-shaped body 132 having an annular surface 134, engagement members 102, 104 having various other shapes and configurations may be used to accomplish the same function as the illustrated engagement members 102, 104. Variations in engagement member shape will not result in a departure from the scope of the present disclosure.

As shown in FIG. 3B, the second engagement member 104 of the disclosed mechanical fastening system 100 may define a recess 140 that axially protrudes into the second engagement member 104 and opens toward the first engagement member 102. In one particular construction, the second engagement member 104 may include a ring-shaped body 142 having an annular surface 144, and the recess 140 may be a groove 146 circumferentially extending along the annular surface 144. While the groove 146 is shown in FIG. 3B as being continuous, it is also contemplated that the groove 146 may be discontinuous (e.g., comprised of two or more spaced groove segments).

The mechanical fastening system 100 may be assembled by positioning the second engagement member 104 over the shaft 114 of the bolt member 110 and threading the nut member 112 onto the bolt member 110. Once assembled, the first engagement member 102 may be axially aligned with the second engagement member 104 such that the recess 130 (e.g., the groove 136) in the first engagement member 102 faces the recess 140 (e.g., the groove 146) in the second engagement member 104.

Figure 4:
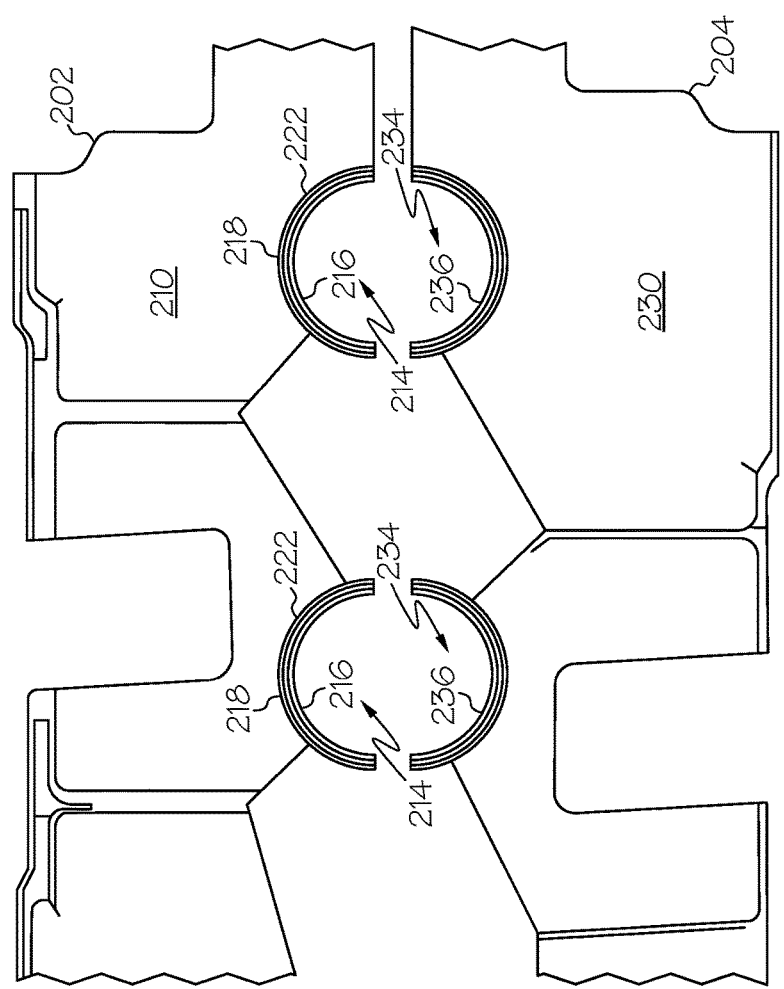
FIG. 4 is a side elevational view of two structural members to be joined by the mechanical fastening system of FIGS. 3A and 3B.
Figure 5:
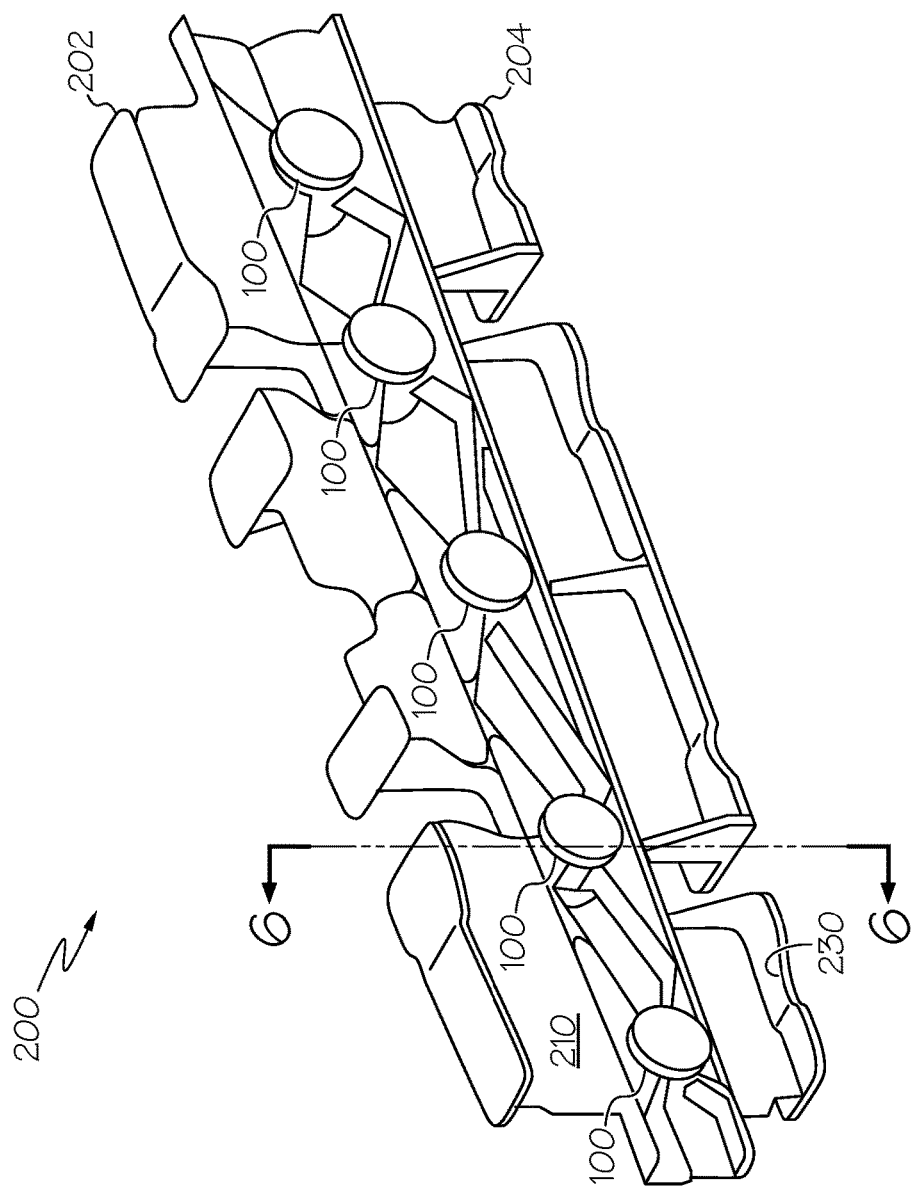
FIG. 5 is a side perspective view of one embodiment of the disclosed structural assembly, which may be formed by joining the structural members of FIG. 4 with the mechanical fastening system of FIGS. 3A and 3B.
Figure 6:
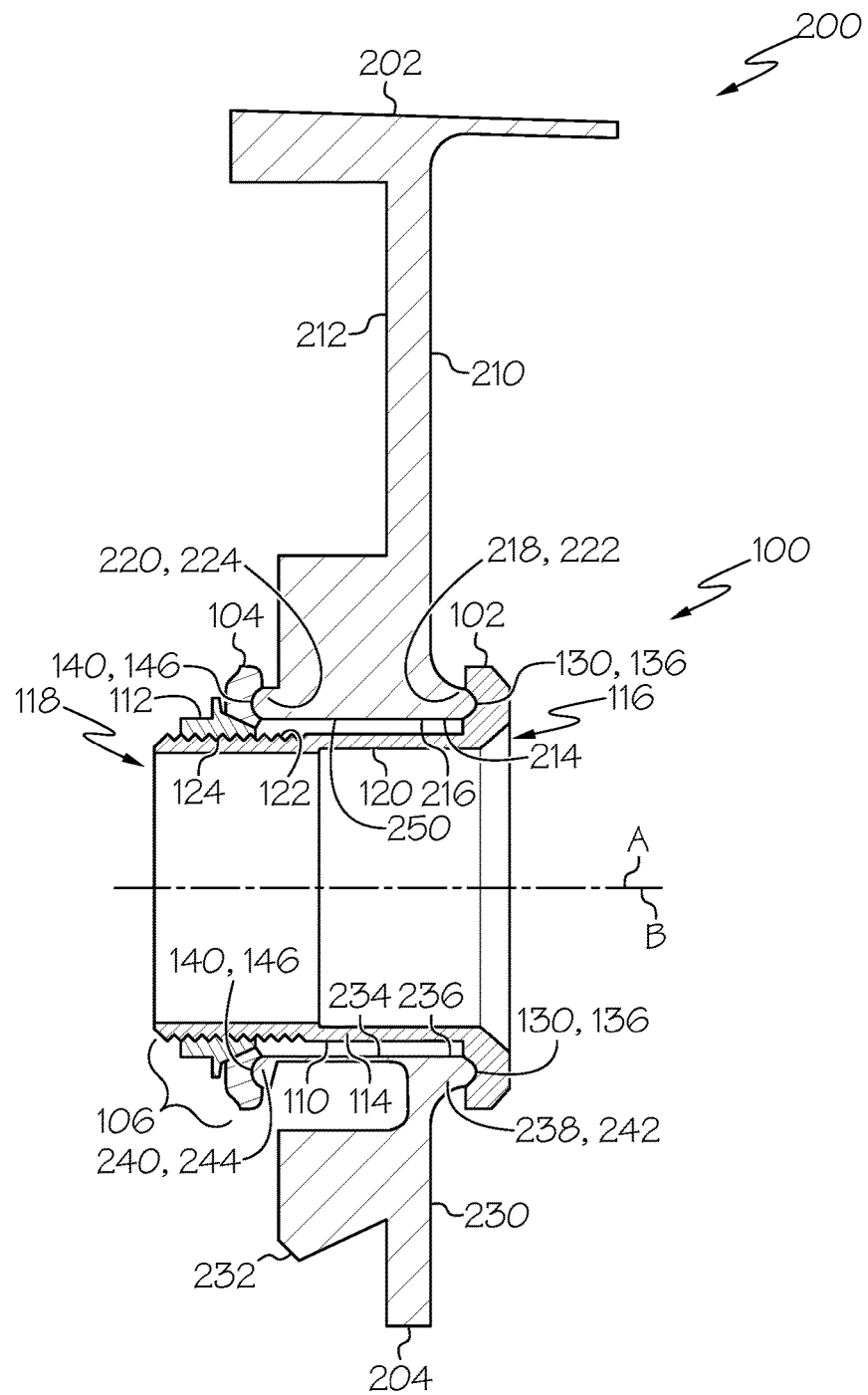
FIG. 6 is a cross-sectional view of the structural assembly of FIG. 5.

The disclosed mechanical fastening system 100 may be used to join two or more structural members 202, 204 (FIG. 4) to yield a structural assembly 200 (FIGS. 5 and 6). Significantly, once the structural members 202, 204 have been joined to form the structural assembly 200, the structural members 202, 204 may later be separated by way of the disclosed mechanical fastening system 100 and, if desired, rejoined by way of the disclosed mechanical fastening system 100.

Referring to FIGS. 5 and 6, one embodiment of the disclosed structural assembly, generally designated 200, may include a first structural member 202, a second structural member 204 and the disclosed mechanical fastening system 100 (five mechanical fastening systems 100 are shown in FIG. 5). The mechanical fastening system 100 may connect the first structural member 202 to the second structural member 204.

The first structural member 202 of the disclosed structural assembly 200 may include a first side 210 and a second side 212 (FIG. 6) opposite the first side 210. As best shown in FIG. 4, the first structural member 202 may define a first partial bore 214 (two first partial bores 214 are shown in FIG. 4) that extends through the first structural member 202 from the first side 210 to the second side 212. The first partial bore 214 has a periphery 216.

As best shown in FIG. 6, a first protrusion 218 may protrude proximate (at or near) the periphery 216 of the first partial bore 214 on the first side 210 of the first structural member 202. Similarly, a second protrusion 220 may protrude proximate (at or near) the periphery 216 of the first partial bore 214 on the second side 212 of the first structural member 202. The first and second protrusions 218, 220 of the first structural member 202 may be sized and shaped to be received, at least partially, within corresponding recesses 130, 140 of the first and second engagement members 102, 104 of the disclosed mechanical fastening system 100.

In one particular construction, the first protrusion 218 of the first structural member 202 may be a first ridge 222, and the first ridge 222 may extend, either entirely or partially, along the periphery 216 of the first partial bore 214. Similarly, the second protrusion 220 of the first structural member 202 may be a second ridge 224, and the second ridge 224 may extend, either entirely or partially, along the periphery 216 of the first partial bore 214. The first and second ridges 222, 224 of the first structural member 202 may be sized and shaped to be received, at least partially, within corresponding grooves 136, 146 of the first and second engagement members 102, 104 of the disclosed mechanical fastening system 100. For example, the first and second ridges 222, 224 may have a rounded cross-sectional profile, as shown in FIG. 6.

Referring again to FIGS. 5 and 6, the second structural member 204 of the disclosed structural assembly 200 may include a first side 230 and a second side 232 (FIG. 6) opposite the first side 230. As best shown in FIG. 4, the second structural member 204 may define a second partial bore 234 (two second partial bores 234 are shown in FIG. 4) that extends through the second structural member 204 from the first side 230 to the second side 232. The second partial bore 234 has a periphery 236.

As best shown in FIG. 6, a first protrusion 238 may protrude proximate (at or near) the periphery 236 of the second partial bore 234 on the first side 230 of the second structural member 204. Similarly, a second protrusion 240 may protrude proximate (at or near) the periphery 236 of the second partial bore 234 on the second side 232 of the second structural member 204. The first and second protrusions 238, 240 of the second structural member 204 may be sized and shaped to be received, at least partially, within corresponding recesses 130, 140 of the first and second engagement members 102, 104 of the disclosed mechanical fastening system 100.

In one particular construction, the first protrusion 238 of the second structural member 204 may be a third ridge 242, and the third ridge 242 may extend, either entirely or partially, along the periphery 236 of the second partial bore 234. Similarly, the second protrusion 240 of the second structural member 204 may be a fourth ridge 244, and the fourth ridge 244 may extend, either entirely or partially, along the periphery 236 of the second partial bore 234. The third and fourth ridges 242, 244 of the second structural member 204 may be sized and shaped to be received, at least partially, within corresponding grooves 136, 146 of the first and second engagement members 102, 104 of the disclosed mechanical fastening system 100. For example, the third and fourth ridges 242, 244 may have a rounded cross-sectional profile, as shown in FIG. 6.

At this point, those skilled in the art will appreciate that the first structural member 202 of the disclosed structural assembly 200 may be the first rib portion 30 (FIG. 2) of the wing 14 (FIG. 2) of the aircraft 10 (FIG. 1) and the second structural member 204 may be the second rib portion 32, such that the structural assembly 200 is the assembled rib 20. However, this is merely one specific and non-limiting aerospace example. Those skilled in the art will appreciate that various structural members 202, 204 may be joined with the disclosed mechanical fastening system 100, and that the particular size, shape, configuration and function of the structural members 202, 204 is not limiting. Indeed, the disclosed structural assembly 200 may be used in various non-aerospace applications, such as in automotive applications, marine applications and residential/commercial construction applications, without departing from the scope of the present disclosure.

Referring now to FIG. 6, to join the first structural member 202 with the second structural member 204, the first structural member 202 may be positioned relative to the second structural member 204 such that the first partial bore 214 of the first structural member 202 is substantially aligned with the second partial bore 234 of the second structural member 204 along a bore axis B. Therefore, the first structural member 202 and the second structural member 204 may define a through-bore 250 that includes the first partial bore 214 and the second partial bore 234.

While a cylindrical through-bore 250 is shown, through-bores having various shapes may be used without departing from the scope of the present disclosure. A cylindrical through-bore 250 is merely one specific, non-limiting example.

With the through-bore 250 defined, the bolt member 110 of the clamping assembly 106 of the disclosed mechanical fastening system 100 may be inserted through the through-bore 250, thereby bringing the first engagement member 102 into engagement with both the first protrusion 218 of the first structural member 202 and the first protrusion 238 of the second structural member 204. When the first engagement member 102 is engaging the first protrusions 218, 238 of the first and second structural members 202, 204, the first protrusions 218, 238 may be received, at least partially, within the recess 130 of the first engagement member 102.

With the bolt member 110 of the clamping assembly 106 of the disclosed mechanical fastening system 100 extending through the through-bore 250, the second engagement member 104 may be received over the second end portion 118 of the bolt member 110. Then, the nut member 112 may be threaded onto the bolt member 110, thereby bringing the nut member 112 into abutting engagement with the second engagement member 104. As the nut member 112 is threaded onto the bolt member 110, the nut member 112 may urge the second engagement member 104 into engagement with both the second protrusion 220 of the first structural member 202 and the second protrusion 240 of the second structural member 204. When the second engagement member 104 is engaging the second protrusions 220, 240 of the first and second structural members 202, 204, the second protrusions 220, 240 may be received, at least partially, within the recess 140 of the second engagement member 104.

As the nut member 112 of the clamping assembly 106 of the disclosed mechanical fastening system 100 is threaded onto the bolt member 110, the first and second structural members 202, 204 become clamped between the first and second engagement members 102, 104. Because the first engagement member 102 is engaged with the first protrusions 218, 238 of the first and second structural members 202, 204 and the second engagement member 104 is engaged with the second protrusions 220, 240 of the first and second structural members 202, 204, separation of the first structural member 202 relative to the second structural member 204 is inhibited.

Accordingly, the disclosed mechanical fastening system 100 may be used to connect two or more structural members 202, 204. The mechanical fastening system 100 may be self-centering, may be capable of withstanding side and tensions loads, and may be at or near weight neutral, particularly when the bolt member 110 includes a bolt member through-bore 120.

Figure 7:
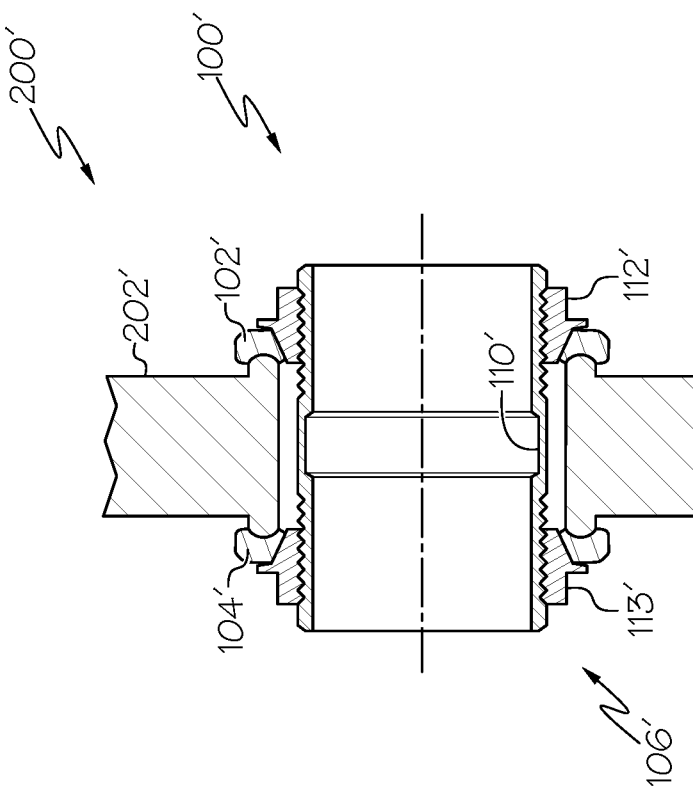
FIG. 7 is a cross-sectional view of another embodiment of the disclosed structural assembly.

Referring to FIG. 7, in one alternative embodiment, the disclosed structural assembly, generally designated 200', may include a first structural member 202', a second structural member 204' and a mechanical fastening system 100'. The mechanical fastening system 100' may include a first engagement member 102', a second engagement member 104' and a clamping assembly 106'. The clamping assembly 106' may be thread-based, and may include a bolt member 110', a first nut member 112' and a second nut member 113'. The first nut member 112' may be in threaded engagement with the bolt member 110', and may be in abutting engagement with the first engagement member 102'. The second nut member 113' may be in threaded engagement with the bolt member 110', and may be in abutting engagement with the second engagement member 104'.

Thus, with structural assembly 200', the first and second structural members 202', 204' are clamped between the first and second engagement members 102', 104' due to threaded engagement of the first and second nut members 112', 113' with the bolt member 110'. This is in contrast to structural assembly 200 (FIG. 6) in which the first engagement member 102 (FIG. 6) is connected to (e.g., integral with) the bolt member 110 (FIG. 6).

Figure 8:
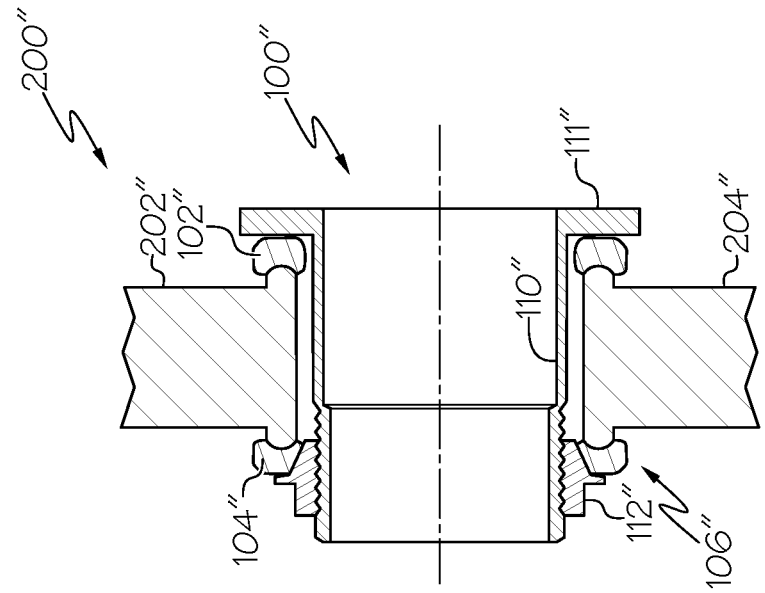
FIG. 8 is a cross-sectional view of yet another embodiment of the disclosed structural assembly.

Referring to FIG. 8, in another alternative embodiment, the disclosed structural assembly, generally designated 200", may include a first structural member 202", a second structural member 204" and a mechanical fastening system 100". The mechanical fastening system 100" may include a first engagement member 102", a second engagement member 104" and a clamping assembly 106". The clamping assembly 106" may be thread-based, and may include a bolt member 110" and a nut member 112". The bolt member 110" may include a flange 111" in abutting engagement with the first engagement member 102". The nut member 112" may be in threaded engagement with the bolt member 110", and may be in abutting engagement with the second engagement member 104". Therefore, the first and second structural members 202", 204" may be clamped between the first and second engagement members 102", 104" by positioning the flange 111" of the bolt member 110" against the first engagement member 102" and threading the nut member 112" into abutting engagement with the second engagement member 104".

Also disclosed is a method for joining a first structural member to a second structural member. Each structural may include a first side, a second side opposite the first side, a partial bore extending from the first side to the second side, a first protrusion extending from a periphery of the partial bore on the first side, and a second protrusion extending from the periphery of the partial bore on the second side.

Figure 9:
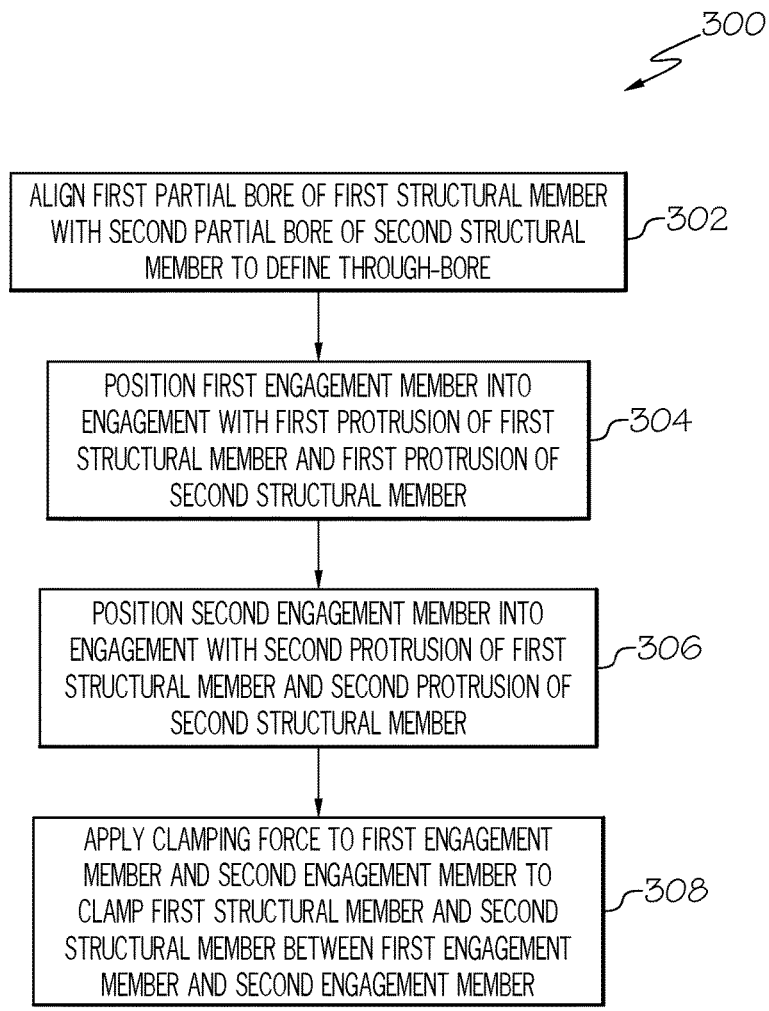
FIG. 9 is a flow diagram depicting one embodiment of the disclosed joining method.

Referring to FIG. 9, one embodiment of the disclosed joining method, generally designated 300, may begin at Block 302 with the step of aligning the partial bore of the first structural member with the partial bore of the second structural member. The partial bores may be aligned along a bore axis to define a through-bore.

At Block 304, a first engagement member may be positioned into engagement with both the first protrusion of the first structural member and the first protrusion of the second structural member. The first engagement member may define one or more recesses (e.g., a circumferential groove), and engagement between the first engagement member and the first protrusions of the first and second structural members may include receiving the first protrusions in the recess of the first engagement member.

At Block 306, a second engagement member may be positioned into engagement with both the second protrusion of the first structural member and the second protrusion of the second structural member. The second engagement member may define one or more recesses (e.g., a circumferential groove), and engagement between the second engagement member and the second protrusions of the first and second structural members may include receiving the second protrusions in the recess of the second engagement member.

At Block 308, a clamping force may be applied to the first engagement member and the second engagement member. The clamping force may clamp the first structural member and the second structural member between the first engagement member and the second engagement member. While a clamping assembly including a bolt member and a nut member is shown and described herein for applying such a clamping force, those skilled in the art will appreciate that various techniques may be used to apply a clamping force to the first engagement member and the second engagement member to clamp the clamp the first structural member and the second structural member between the first engagement member and the second engagement member.

Figure 10:
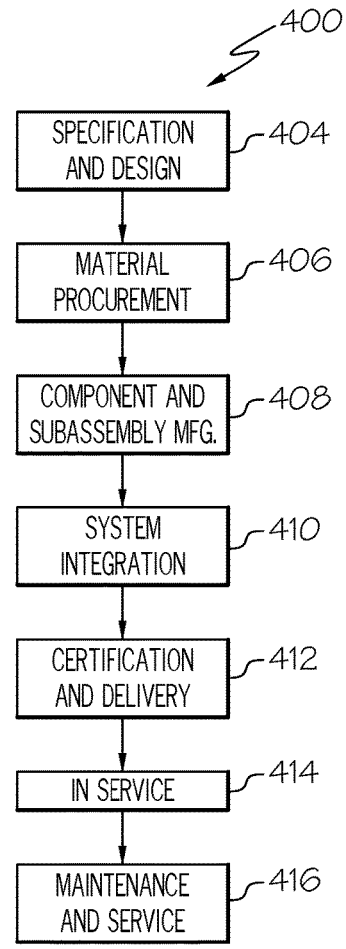
FIG. 10 is a flow diagram of an aircraft manufacturing and service methodology.
Figure 11:
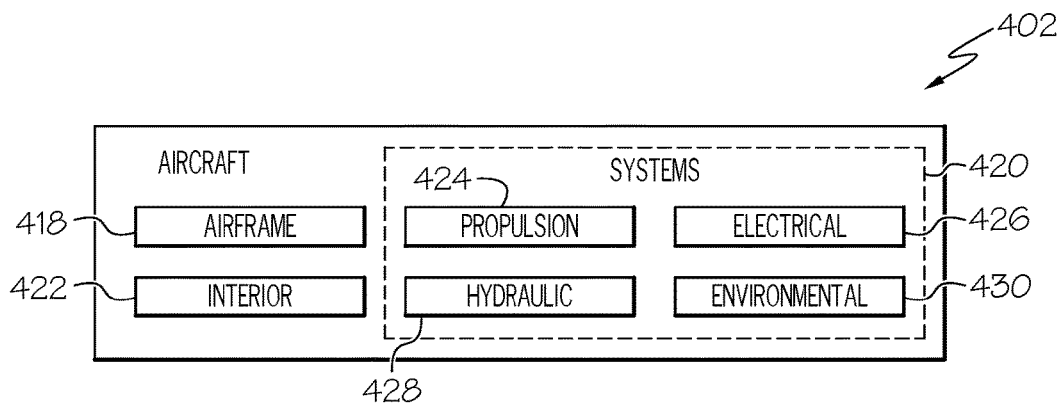
FIG. 11 is a block diagram of an aircraft.

Examples of the disclosure may be described in the context of an aircraft manufacturing and service method 400, as shown in FIG. 10 and an aircraft 402, as shown in FIG. 11. During pre-production, the aircraft manufacturing and service method 400 may include specification and design 404 of the aircraft 402 and material procurement 406. During production, component/subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 402 produced by example method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included.

The disclosed mechanical fastening system and associated structural assembly and method may be employed during any one or more of the stages of the aircraft manufacturing and service method 400. As one example, components or subassemblies corresponding to component/subassembly manufacturing 408, system integration 410, and or maintenance and service 416 may be fabricated or manufactured using the disclosed mechanical fastening system and associated structural assembly and method. As another example, the airframe 418 may be constructed using the disclosed mechanical fastening system and associated structural assembly and method. Also, one or more apparatus examples, method examples, or a combination thereof may be utilized during component/subassembly manufacturing 408 and/or system integration 410, for example, by substantially expediting assembly of or reducing the cost of an aircraft 402, such as the airframe 418 and/or the interior 422. Similarly, one or more of system examples, method examples, or a combination thereof may be utilized while the aircraft 402 is in service, for example and without limitation, to maintenance and service 416.

The disclosed mechanical fastening system and associated structural assembly and method are described in the context of an aircraft; however, one of ordinary skill in the art will readily recognize that the disclosed mechanical fastening system and associated structural assembly and method may be utilized for a variety of applications. For example, the disclosed mechanical fastening system and associated structural assembly and method may be implemented in various types of vehicles including, e.g., helicopters, passenger ships, automobiles and the like.

Although various embodiments of the disclosed mechanical fastening system and associated structural assembly and method have been shown and described, modifications may occur to those skilled in the art upon reading the specification. The present application includes such modifications and is limited only by the scope of the claims.

What is claimed is:

1. A structural assembly comprising:
   a first structural member comprising a first side and a second side opposite said first side, and defining a first partial bore extending from said first side to said second side, said first structural member further comprising a first protrusion protruding proximate a periphery of said first partial bore on said first side of said first structural member and a second protrusion protruding proximate said periphery of said first partial bore on said second side of said first structural member;
   a second structural member comprising a first side and a second side opposite said first side, and defining a second partial bore extending from said first side to said second side, said second structural member further comprising a first protrusion protruding proximate a periphery of said second partial bore on said first side of said second structural member and a second protrusion protruding proximate said periphery of said second partial bore on said second side of said second structural member, wherein said second partial bore is aligned with said first partial bore along a bore axis to define a through-bore;
   a first engagement member engaged with both said first protrusion of said first structural member and said first protrusion of said second structural member; and
   a second engagement member engaged with both said second protrusion of said first structural member and said second protrusion of said second structural member,
   wherein said first structural member and said second structural member are clamped between said first engagement member and said second engagement member.

2. The structural assembly of claim 1 wherein said first protrusion of said first structural member protrudes as a first ridge along at least a portion of said periphery of said first partial bore, and wherein said first protrusion of said second structural member protrudes as a second ridge along at least a portion of said periphery of said second partial bore.

3. The structural assembly of claim 2 wherein said first ridge extends substantially entirely along said periphery of said first partial bore, and wherein said second ridge extends substantially entirely along said periphery of said second partial bore.

4. The structural assembly of claim 2 wherein said second protrusion of said first structural member protrudes as a third ridge along at least a portion of said periphery of said first partial bore, and wherein said second protrusion of said second structural member protrudes as a fourth ridge along at least a portion of said periphery of said second partial bore.

5. The structural assembly of claim 4 wherein said third ridge extends substantially entirely along said periphery of said first partial bore, and wherein said fourth ridge extends substantially entirely along said periphery of said second partial bore.

6. The structural assembly of claim 5 wherein each of said first ridge, said second ridge, said third ridge and said fourth ridge has a rounded cross-sectional profile.

7. The structural assembly of claim 1 wherein said first protrusion of said first structural member and said first protrusion of said second structural member are at least partially received in a corresponding recess in said first engagement member.

8. The structural assembly of claim 7 wherein said first engagement member comprises an annular surface, and wherein said corresponding recess in said first engagement member is a groove circumferentially extending along said annular surface.

9. The structural assembly of claim 8 wherein said second engagement member comprises a groove, and wherein both said second protrusion of said first structural member and said second protrusion of said second structural member are at least partially received in said groove of said second engagement member.

10. The structural assembly of claim 1 further comprising a clamping assembly clamping said first structural member and said second structural member between said first engagement member and said second engagement member, said clamping assembly comprising:
   a bolt member extending through said through-bore; and
   a nut member in threaded engagement with said bolt member and in abutting engagement with said second engagement member.

11. The structural assembly of claim 10 wherein said first engagement member is integral with said bolt member.

12. The structural assembly of claim 10 wherein said clamping assembly further comprises a second nut member in threaded engagement with said bolt member and in abutting engagement with said first engagement member.

13. The structural assembly of claim 10 wherein said bolt member comprises a flange in abutting engagement with said first engagement member.

14. The structural assembly of claim 10 wherein said bolt member defines a bolt member through-bore.

15. An aircraft comprising said structural assembly of claim 1.

16. The aircraft of claim 15 wherein said first structural member is a first rib portion and said second structural member is a second rib portion, and wherein a first skin portion is connected to said first rib portion and a second skin portion is connected to said second rib portion.

17. A structural assembly comprising:
   a first structural member comprising a first side and a second side opposite said first side, and defining a first partial bore extending from said first side to said second side, said first structural member further comprising a first ridge protruding along a periphery of said first partial bore on said first side of said first structural member and a second ridge protruding along periphery of said first partial bore on said second side of said first structural member;
   a second structural member comprising a first side and a second side opposite said first side, and defining a second partial bore extending from said first side to said second side, said second structural member further comprising a third ridge protruding along a periphery of said second partial bore on said first side of said second structural member and a fourth ridge protruding along said periphery of said second partial bore on said second side of said second structural member, wherein said second partial bore is aligned with said first partial bore along a bore axis to define a through-bore;
   a first engagement member comprising a first groove receiving both said first ridge and said third ridge;
   a second engagement member comprising a second groove receiving both said second ridge and said fourth ridge; and
   a clamping assembly clamping said first structural member and said second structural member between said first engagement member and said second engagement member, said clamping assembly comprising:
      a bolt member extending through said through-bore; and
      a nut member in threaded engagement with said bolt member and in abutting engagement with said second engagement member.

18. A method for joining a first structural member to a second structural member, each of said first structural member and said second structural member comprising a first side, a second side opposite said first side, a partial bore extending from said first side to said second side, a first protrusion protruding proximate a periphery of said partial bore on said first side, and a second protrusion protruding proximate said periphery of said partial bore on said second side, said method comprising the steps of:
   aligning said partial bore of said first structural member with said partial bore of said second structural member along a bore axis to define a through-bore;
   positioning a first engagement member into engagement with both said first protrusion of said first structural member and said first protrusion of said second structural member;
   positioning a second engagement member into engagement with both said second protrusion of said first structural member and said second protrusion of said second structural member; and
   applying a clamping force to clamp said first structural member and said second structural member between said first engagement member and said second engagement member.

19. The method of claim 18 wherein said through-bore is cylindrical, wherein said first protrusions and said second protrusions extend as ridges along said cylindrical through-bore, and wherein said first engagement member and said second engagement member comprise grooves that receive at least portions of said ridges.

20. The method of claim 18 wherein said applying said clamping force comprises:
   passing a bolt member through said through-bore; and
   threading a nut member into engagement with said bolt member.

* * * * *